2,878,244

WATER-INSOLUBLE AZO DYESTUFFS AND PROCESS FOR THEIR MANUFACTURE

Albert Schmelzer, Benidorm, Alicante, Spain, and Ludwig Nüssler, Leverkusen-Bayerwerk, and Karl-Heinz Gehringer, Koln-Deutz, Germany, assignors to Farbenfabriken Bayer Aktiengesellschaft, Leverkusen, Germany, a corporation of Germany No Drawing. Application June 25, 1957
Serial No. 667,962

Claims priority, application Germany July 11, 1956

5 Claims. (Cl. 260—164)

The present invention relates to water-insoluble azo dyestuffs and to a process for their manufacture; more particularly it relates to water-insoluble azo dyestuffs corresponding to the formula

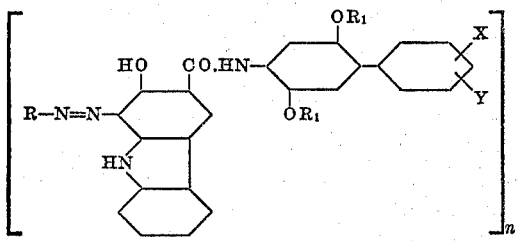

In this formula R means a radical of a diazo compound being free of sulfonic acid and carboxylic acid groups, $R_1$ stands for lower alkyl and X and Y denote hydrogen or non-ionic substituents and $n$ stands for the integer 1 or 2.

In accordance with the invention it has been found that valuable water-insoluble azo dyestuffs are obtainable by coupling diazo or tetrazo compounds of the aromatic or heterocyclic series in substance or on a substrate, with arylides from 2-hydroxycarbazole-3-carboxylic acids and 4-amino-2,5-dialkoxy-diphenyl or its derivatives substituted by non-ionic radicals in the nucleus free from the amino group.

Water-insoluble azo dyestuffs which are obtained by coupling diazotized aromatic or heterocyclic amines with arylides of 2-hydroxycarbazole-3-carboxylic acid, are known from German specification No. 551,880. The dyeings obtainable on the fibre according to the examples of the aforesaid specification exhibit a very strong change of shade, however, in the conventional after-treatment with a boiling soap solution or other emulsifying agents. In contrast, the dyeings obtained with the new dyestuffs exhibit when after-treated in a boiling soap bath a substantially lesser change of shade. The advantage of a lesser change of shade is especially valuable since under practical conditions, for example when dyeing on the jigger, it is generally not possible to attain the high temperatures required for the dyeing of naphthols according to the process of German Patent No. 551,880 in order to obtain the final shade. Moreover, the new arylides excel the known compounds by their higher affinity for the fibre.

The 4-amino-2,5-dialkoxydiphenyl and its derivatives substituted as previously defines in the nucleus free of the amino group, not hitherto used for the production of arylides, are obtainable by coupling, e. g. diazotized p-anisidine with benzoquinone, reducing the obtained 4'-methoxy-diphenylquinone-2,5, alkylating the 4'-methoxy-2,5-dihydroxydiphenyl thus formed, converting the 2,5,4'-trimethoxydiphenyl into its 4-nitro derivative, reducing the nitro group and condensing the resulting 4-amino-2,5,4'-trimethoxydiphenyl with 2-hydroxycarbazole-3-carboxylic acid.

The following examples are given for the purpose of illustrating the invention without, however, limiting it thereto.

Example 4 grams of 4-(2'-hydroxycarbazole-3'-carboylamino)-2,5,4''-trimethoxy-diphenyl are dissolved with 12 millilitres of alcohol, 4 millilitres of water and 2 millilitres of sodium hydroxide (38° Bé.). This concentrated solution is introduced into a solution of 20 millilitres of Turkey red oil and 20 millilitres of sodium hydroxide in 2 litres of water. 100 grams of cotton are introduced into the dye bath thus prepared and treated at 30° C. for ½ hour. The impregnated fabric is then well squeezed and developed in a developing bath containing 2.5 grams of diazotized 3-chloraniline and 60 grams of sodium chloride per 2 litres of water. The development is carried out at a low temperature with ½ hour. The brown dyeing thus obtained is then rinsed and after-treated for ½ hour in a boiling soap bath containing 3 grams of soap and 2 grams of sodium carbonate per litre in order to improve the fastness properties. The yellowish brown dyeing thus obtained does not show any substantial difference in shade in comparison with the non-soaped dyeing.

The 4-(2'-hydroxycarbazole-3'-carboylamino)-2,5,4''-trimethoxy-diphenyl used as coupling component can be obtained as follows:

24.6 grams of p-anisidine are tetrazotized as usual in acid solution and combined with 30.0 grams of p-benzoquinone dissolved in 3 litres of water, 36 grams of sodium acetate and 50 grams of hydrochloric acid. The reaction proceeds with generating of nitrogen. The 4'-methoxy-diphenyl quinone-2,5 thus obtained is reduced with the action of iron in hydrochloric acid solution and the resulting 4'-methoxy-2,5-hydroxydiphenyl is methylated with 80 millilitres of dimethyl sulfate in soda-alkaline solution within 3 hours. 40 grams of 2,5,4'-trimethoxy diphenyl ($Kp_{11}$ 210-220°) are obtained.

49 grams of 2,5,4'-trimethoxy diphenyl are then treated with 33 grams of nitric acid (40%) at 80-100° within 2 hours and the 4-nitro-2,5,4'-trimethoxydiphenyl thus obtained is reduced in acid medium according to known methods.

11.6 grams of 4-amino-2,5,4'-trimethoxydiphenyl are then heated at 60° C. with 10.7 grams of 2-hydroxycarbazole-3-carboxylic acid in 150 millilitres of toluene. After the addition of 3.3 grams of phosphorus trichloride, the mixture is boiled for 4 to 6 hours. After cooling the product is isolated and purified. 20 grams of 4-(2'-hydroxycarbazole-3'-carboylamino) - 2,5,4'' - trimethoxydiphenyl having a melting point of 234–235° C. are obtained.

The other coupling components used in the following examples may be prepared in analogous manner.

The dyeings listed in the following table are obtained in analogous manner with 4-(2'-hydroxycarbazole-3'-carboylamine)-2,5,4''-trimethoxydiphenyl of its substitution products, and with other diazotizable amines.

| Azo component | Diazo or tetrazo component | Shade on Cotton |
|---|---|---|
| 4 - (2' - hydroxycarbazole - 3' - carboylamino) - 2,5,4'''-trimethoxydiphenyl. | 1 - amino - 2 - chloro - 5 - trifluoromethyl - benzene. | yellowish brown. |
| Do | 1-amino-2,5-dichlorobenzene | reddish brown. |
| Do | 1-amino-2-methyl-5-chlorobenzene | Do. |
| Do | 1 - amino - 2 - methoxybenzene - 5 - sulfo - diethylamide. | Do. |
| Do | 1-amino-2-methoxy-5-chlorobenzene | Do. |
| Do | 1-amino-2-nitro-4-methylbenzene | strongly reddish brown. |
| Do | 1-amino-2-nitro-4-chlorobenzene | reddish brown. |
| Do | 4-chloro-2-amino-1,1'-diphenyl ether | Do. |
| Do | 4,4'-dichloro-2-amino-1,1'-diphenylether | Do. |
| Do | 1-amino-2-methoxybenzene-5-ethylsulfone | Do. |
| Do | 1-amino-2-nitro-4-methoxybenzene | strongly reddish brown. |
| Do | 4,4'-dimethyl-2,2'-diamino-1,1'-azobenzene | reddish dark brown. |
| Do | 1-amino-2,5-diethoxy-4-benzoylaminobenzene. | violettish dark brown. |
| 4 - (2' - hydroxycarbazole - 3' - carboylamino) - 2,5,4'' - trimethoxy - 3'' - chlorodiphenyl (M. P. 233° C.). | 1-amino-2-chloro-5-trifluoromethylbenzene | yellowish brown. |
| Do | 1-amino-2,5-dichlorobenzene | Do. |
| Do | 1 - amino - 2 - methoxybenzene - 5 - benzylsulfone. | reddish brown. |
| Do | 1 - amino - 2 - methoxybenzene - 5 - sulfodiethylamide. | Do. |
| Do | 1-amino-2-methoxy-5-chlorobenzene | Do. |
| Do | 1-amino-2-nitro-4-methylbenzene | Do. |
| Do | 4,4' - dimethyl - 2,2' - diamino - 1,1' - azobenzene. | violettish dark brown. |
| 4 - (2' - hydroxycarbazole - 3' - carboylamino) - 2,5,3'' - trimethoxydiphenyl (M. P. 182° C.). | 1-amino-2-methyl-5-chlorobenzene | reddish brown. |
| Do | 1-amino-2-methyl-4-chlorobenzene | Do. |
| Do | 1-amino-2-nitro-4-methylbenzene | reddish brown. |
| 4 - (2' - hydroxycarbazole - 3' - carboylamino) - 2,5-dimethoxydiphenyl (M. P. 223° C.). | 1-amino-2-methoxy-5-nitrobenzene | brown. |
| Do | 1-amino-2-methyl-3-chlorobenzene | Do. |
| Do | 1-amino-2-methyl-4-chlorobenzene | reddish brown. |
| Do | 1 - amino - 2 - chloro - 4 - benzoylamino - 5 - methoxybenzene. | strongly reddish brown. |
| Do | 2-aminocarbazole | violettish brown. |
| 4 - (2' - hydroxycarbazole - 3' - carboylamino) - 2,5 - dimethoxy - 4'' - chlorodiphenyl (M. P. 245° C.). | 1-amino-3-chlorobenzene | yellowish brown. |
| Do | 1-amino-2,5-dichlorobenzene | reddish brown. |
| Do | 1 - amino - 2 - methoxybenzene - 5 - benzylsulfone. | red brown. |
| Do | 1-amino-2-methyl-4-chlorobenzene | dark red brown. |
| Do | 1-amino-2-nitro-4-methylbenzene | reddish brown. |
| Do | 1 - amino - 2 - methylbenzene - 5 - ethylsulfone. | yellowish brown. |
| Do | 4,4' - dimethyl - 3,3' - diamino - 1,1' - azobenzene. | reddish dark brown. |
| Do | 4,4'-dichloro-2-amino-1,1'-diphenyl ether | yellowish brown. |

We claim:

1. Water-insoluble azo dyestuffs corresponding to the formula

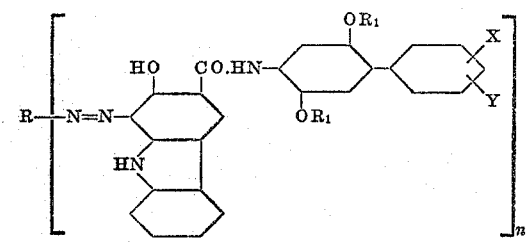

wherein R means a radical of a diazo compound selected from the group consisting of the benzene, diphenyl-ether, benzene azobenzene, and carbazole series being free of sulfonic and carboxylic acid groups, $R_1$ stands for lower alkyl, X and Y mean radicals selected from the group consisting of hydrogen and non-ionic radicals and $n$ stands for one of the integers 1 and 2.

2. The monoazo dyestuff corresponding to the formula

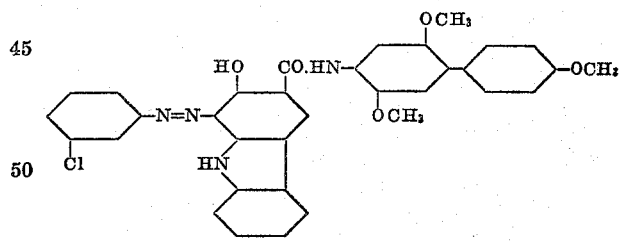

3. The monoazo dyestuff corresponding to the formula

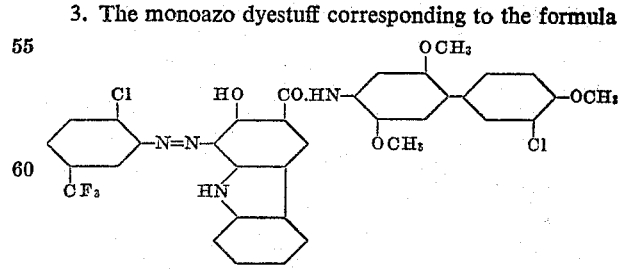

4. The monoazo dyestuff corresponding to the formula

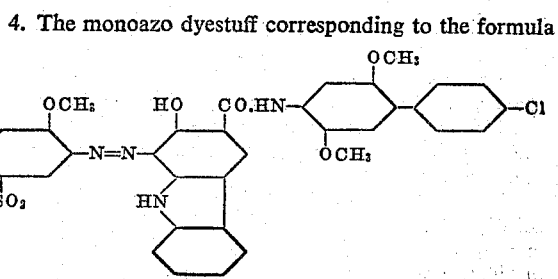

5. The trisazo dyestuff corresponding to the formula
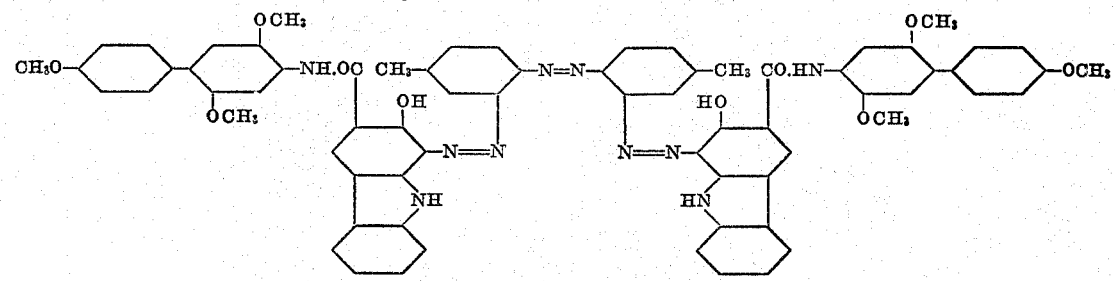
References Cited in the file of this patent
UNITED STATES PATENTS
| | | | |
|---|---|---|---|
| 1,940,059 | Muth | | Dec. 19, 1933 |
| 2,071,702 | Muth | | Feb. 23, 1937 |
| 2,496,255 | Von Glahn | | Jan. 31, 1950 |